(12) United States Patent
Rahman (10) Patent No.: US 9,440,862 B1
(45) Date of Patent: Sep. 13, 2016

(54) METHOD AND APPARATUS FOR ACCELERATED OPEN AIR EVAPORATION OF WASTEWATER

(71) Applicant: Shafiq Ur Rahman, Westchester, IL (US)

(72) Inventor: Shafiq Ur Rahman, Westchester, IL (US)

(*) Notice: Subject to any disclaimer, the term of this patent is extended or adjusted under 35 U.S.C. 154(b) by 347 days.

(21) Appl. No.: 13/873,044

(22) Filed: Apr. 29, 2013

(51) Int. Cl.
| | | |
|---|---|---|
| *B01D 1/22* | (2006.01) | |
| *C02F 1/14* | (2006.01) | |
| *C01D 3/06* | (2006.01) | |
| *C01D 3/08* | (2006.01) | |
| *F24J 2/38* | (2014.01) | |
| *B01D 1/24* | (2006.01) | |
| *C02F 1/04* | (2006.01) | |
| *F24J 2/04* | (2006.01) | |

(52) U.S. Cl.
CPC . *C02F 1/14* (2013.01); *B01D 1/24* (2013.01); *B01D 1/22* (2013.01); *C01D 3/06* (2013.01); *C01D 3/08* (2013.01); *C02F 1/047* (2013.01); *F24J 2/0461* (2013.01); *F24J 2/0466* (2013.01); *F24J 2/0472* (2013.01); *F24J 2/0488* (2013.01); *F24J 2/38* (2013.01); *Y10S 159/906* (2013.01)

(58) Field of Classification Search
CPC ...... Y10S 159/906; C02F 1/047; C02F 1/14; B01D 1/24; B01D 1/22; F24J 2/0461; F24J 2/0466; F24J 2/0472; F24J 2/0488; F24J 2/38; C01D 3/06; C01D 3/08
USPC .................... 159/49, 906, 903, 32
See application file for complete search history.

(56) References Cited

U.S. PATENT DOCUMENTS

| | | | | |
|---|---|---|---|---|
| 681,407 | A * | 8/1901 | Coward | C01D 3/06 159/45 |
| 3,490,513 | A * | 1/1970 | Villanueva | C01D 3/06 159/2.1 |
| 3,964,960 | A * | 6/1976 | Marans | B01D 1/00 159/49 |
| 4,704,189 | A * | 11/1987 | Assaf | B01D 1/14 159/48.2 |
| 5,509,996 | A * | 4/1996 | Assaf | B01D 1/14 159/4.01 |
| 5,628,879 | A * | 5/1997 | Woodruff | C02F 1/14 159/903 |
| 6,027,607 | A * | 2/2000 | Corniel | B01D 1/16 159/23 |
| 8,763,601 | B2 * | 7/2014 | Doyle | F24J 2/10 126/604 |
| 2014/0209450 | A1 * | 7/2014 | Peever | F26B 5/16 203/10 |

* cited by examiner

*Primary Examiner* — Renee E Robinson
*Assistant Examiner* — Jonathan Pilcher
(74) *Attorney, Agent, or Firm* — Kelly & Krause, L.P.; W. Dennis Drehkoff (57) ABSTRACT

A device and method of accelerating the evaporation of wastewater and concentration of solids wherein an evaporative material contacts wastewater allowing the wastewater to migrate onto the surface of the evaporative material where the sun and wind evaporates the wastewater in an accelerated manner due to the configuration of the evaporative material.

10 Claims, 7 Drawing Sheets

| ID | Length | Width | Area | Dry Weight Per Sq. Meter | Dry Weight | Wet Weight | Brine Weight | Retained Brine | Retained Ratio |
|---|---|---|---|---|---|---|---|---|---|
| # | M | M | $M^2$ | $g/M^2$ | g | g | g | $g/M^2$ | |
| Plain Cloth | | | | | | | | | |
| 1 | 1.34 | 0.49 | 0.69 | 164 | 113 | 218 | 105 | 152 | |
| 2 | 1.07 | 0.48 | 0.52 | 112 | 58 | 122 | 64 | 123 | |
| 3 | 1.05 | 0.48 | 0.52 | 112 | 57 | 122 | 65 | 125 | |
| 4 | 1.10 | 0.48 | 0.55 | 175 | 95 | 292 | 197 | 358 | |
| Terry Cloth | | | | | | | | | |
| 11 | 0.61 | 0.38 | 0.23 | 400 | 95 | 386 | 291 | 1255 | 8 |
| 12 | 0.27 | 0.27 | 0.07 | 414 | 29 | 118 | 89 | 1221 | 8 |
| 13 | 0.61 | 0.39 | 0.23 | 622 | 142 | 539 | 397 | 1690 | 11 |
| 14 | 0.75 | 0.25 | 0.19 | 595 | 107 | 491 | 384 | 2062 | 14 |

FIG. 8

METHOD AND APPARATUS FOR ACCELERATED OPEN AIR EVAPORATION OF WASTEWATER

BACKGROUND

1. Field of the Invention

This invention relates to the acceleration of wind and solar evaporation of waste water and weak chemical solutions, and more specifically, to the acceleration of solar and wind evaporation of water and weak solutions in ponds and tanks by the use of an
evaporative material with a relatively high surface area allowing the water and weak solutions to migrate into the material and be exposed to the sun and air for accelerated evaporation.

2. Brief Description of the Prior Art

Wastewaters and weak chemical solutions, generally defined herein as wastewater, are problematic when used in industrial operations as the wastewater must be disposed of without harming the environment. Wastewater typically includes solids dissolved or suspended therein and they must be recovered in an environmentally safe manner. Wastewater is typically held in ponds where the solids are concentrated by open-air evaporation. This process of evaporation is slow and often unsuitable for industrial processes. Suspended solids which settle to the bottom of the pond are periodically removed. Suspended solids can be removed by filtration. Conventional methods of increasing the evaporation from ponds include the use of spray nozzles to force pond wastewater into the air as a spray. However, spraying is environmentally unsafe for the spray, containing dissolved contaminants, can be blown by the wind beyond the pond where the drops of spray can percolate into a water table below ground. Accordingly, an increase in the rate of solar and wind evaporation assists in the processing of wastewater by decreasing the volume of wastewater and increasing the recovery of solids.

SUMMARY OF THE INVENTION

The present invention provides a device and method for the evaporation of wastewater and concentration of solids in an open air environment. Evaporative components are supported on the banks of a pond or sidewalls or support surface of a tank of wastewater. Attached to the components is evaporative material, which is a fabric with a high surface area for absorbing wastewater, while allowing the wastewater to migrate on the fabric, preferably a fabric containing loops for increased absorption, is utilized. The device and evaporative material have improved results when compared to other fabrics for the evaporation of wastewater and the concentration of solids therefrom.

BRIEF DESCRIPTION OF THE DRAWINGS

The accompanying drawings, which are incorporated in and constitute a part of the specification, illustrate by way of non-limiting embodiments of the invention, and, together with the description, serve to explain the invention.

DETAILED DESCRIPTION

The present invention comprises an improved evaporative material that has increased surface area for evaporation of wastewater and concentration of solids contained in the wastewater.

Wastewater and weak chemical solutions are generally defined herein as wastewater. An evaporative material is defined as a substance that absorbs wastewater and serves as a vehicle for holding the wastewater as it evaporates and concentrates solids by action of wind and/or solar energy. The material allows the wastewater to migrate by capillary action causing more of the wastewater to be exposed to wind and sun for accelerated evaporation and concentration of solids. The evaporative material has more surface area than other materials generally used for absorbing wastewater, and therefore, has increased evaporative and concentrative capacities.

An evaporative component is defined as a structure for supporting the evaporative material. The design of the component enables an increase of the surface area of the evaporative material by the manner in which the material is engaged to the component. The evaporative component allows significant amounts of the surface of the evaporative material to be exposed to the wind and sun for efficient, increased and accelerated evaporation over prior art materials.

By surface area, it is the meant nominal surface area that measures the length multiplied by the width of the evaporative material. The preferred evaporative material of the present invention utilizes material, preferably fabric, with individual loops, therefore, the nominal surface area of the preferred evaporative material will provide greater absorption and retention of wastewater than the identical surface area of evaporative material that does not include loops of material.

A portion of the evaporative material contacts the wastewater. The evaporative material serves as a wick. The wastewater migrates on the evaporative material, and in an open air environment, exposes the wastewater to wind and sun. As the wastewater evaporates on the evaporative material, more wastewater wicks onto the evaporative material.

The evaporative component is movable and oriented to follow the track of the sun allowing increased evaporation and concentration of solids. In one embodiment, the evaporative material is wetted to assist in the distribution of waste water on the evaporative material leading to increased evaporation and concentration of solids from the wastewater. Wetting the evaporative material increases the amount of wastewater on the evaporative material and therefore extends the surface of the evaporative material allowing more evaporation of waste water and improved concentration of solids to occur.

The wastewater is typically contained in a pond with evaporative material and evaporative components secured to the banks of the pond in a manner such that a portion of the evaporative material is in contact with the water The wastewater may also be contained in a tank in an open air environment. The evaporative components holding the evaporative material are attached to the sidewalls of the tank, which is supported on a floor, or ground for support. The tank may optionally have a cover to keep contaminants, rain and snow out of the water. The cover is translucent allowing sunlight to pass through to evaporate the water and concentrate the solids in the wastewater.

Figure 1:
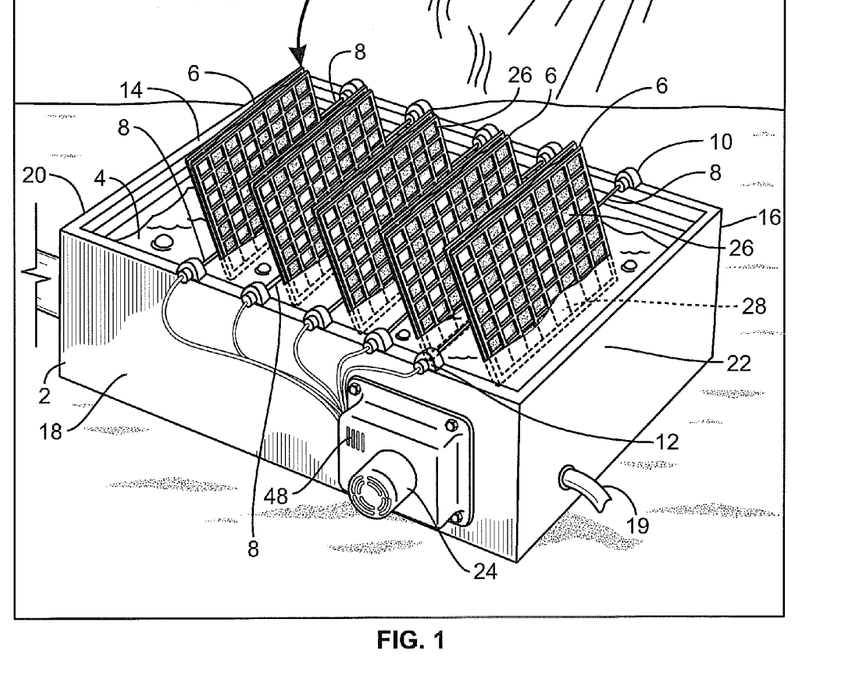
FIG. 1 is a perspective view of an evaporation device according to one embodiment of the present invention.
Figure 2:
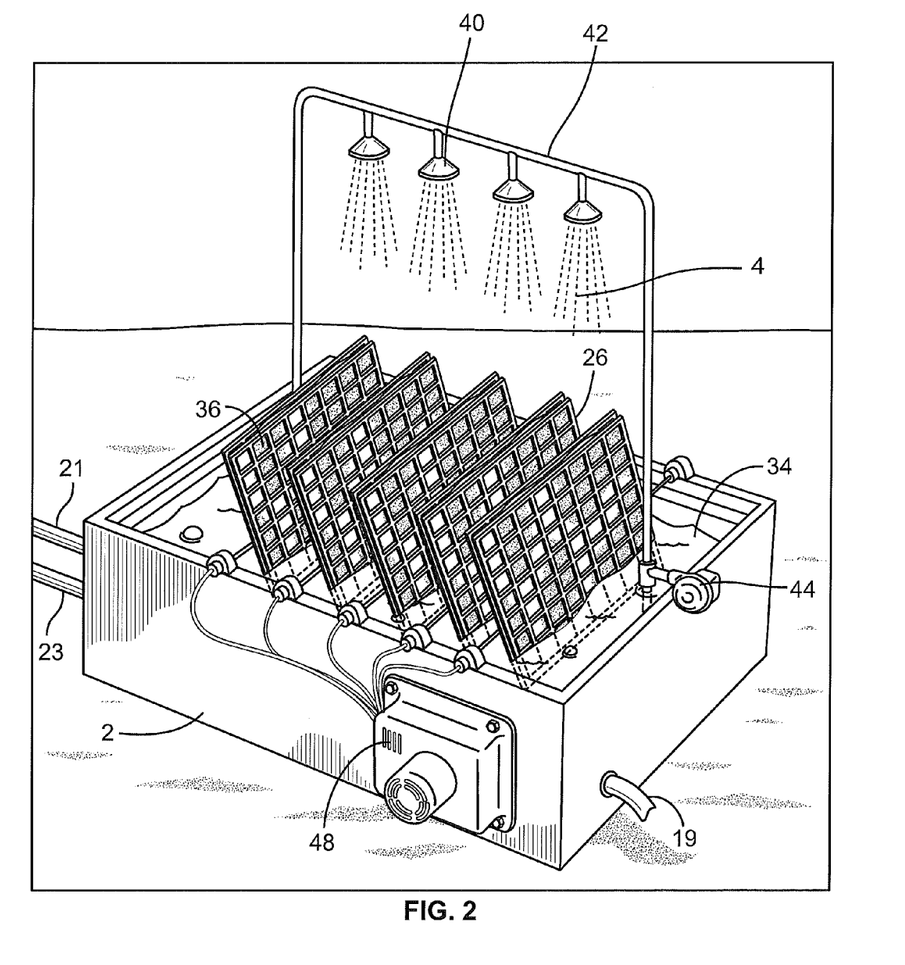
FIG. 2 is a perspective view of another embodiment of the present invention.
Figure 4:
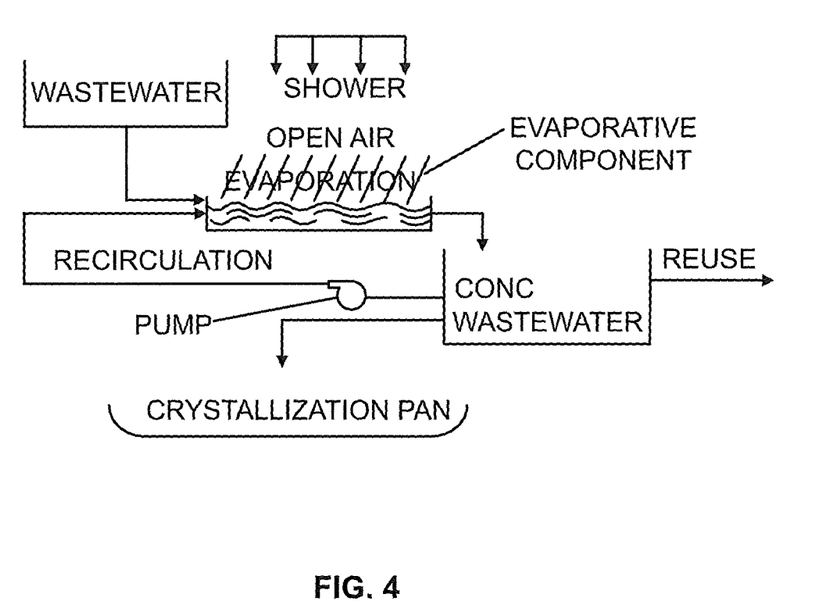
FIG. 4 is a flow diagram of another embodiment of the present invention and shows the crystallization of solids and recirculation of wastewater.

Referring to FIG. 1-2, there is tank 2 filled with wastewater 4 with a plurality of evaporative components 6 oriented above wastewater 4. Only one evaporative component 6 is shown in the figures, however, in practice a plurality of evaporative components may be utilized and is preferred. Evaporative components 6 refer to a single or plurality of evaporative components identified by number 6. Evaporative components 6 are connected to a plurality of transverse rotatable support members 8 which are attached to opposed rotatable connectors 10 and 12 which are supported on top edge 14 of tank 2. More specifically they are supported on top edge 14 of opposed sidewalls 16 and 18. Top edge 14 also runs along the top of end walls 20 and 22 of tank 2. Transverse rotatable support members 8 are placed over wastewater 4 allowing the evaporative component 6 to be attached thereto. Transverse rotatable support members 8 are rotated by opposed rotatable connectors 10 and 12 by power plant 24 that energizes tracking device 48 thus allowing evaporative components 6 to track the sun allowing maximum solar energy to reach evaporative material 26. Lower end 28 of evaporative component 6 is positioned to be in contact with wastewater 4 allowing evaporative material 26 to be in constant contact with wastewater 4. Tank 2 is placed on a floor or ground. When tank 2 is placed in a body of wastewater or on the banks of a pond, for example, legs 30 and 32 or a plurality of legs may be utilized to support tank 2 as shown in FIG. 4. Connecting members 33 join legs 30 and 32 and support opposed rotatable connectors 10 and 12. Thus, evaporative components 6 are maintained at a level on the wastewater surface 34 so that evaporative material 26, or a portion thereof, wicks wastewater 4. Evaporative material 26 when in contact with wastewater 4 allows the wastewater to migrate by capillary action within evaporative material 26. Typically, evaporative components 6 are oriented vertically, allowing wastewater 4 to migrate upwards from surface 34 of water 4 as shown generally in FIGS. 1-2. As wastewater 4 migrates vertically, more wastewater wicks or migrates onto evaporative material 26 thus increasing the surface area. When wastewater 4 evaporates from the extended area 36 more wastewater 4 migrates onto evaporative material 26 thereby continuing the evaporative and concentrative effects. Drain 19 moves the concentrated wastewater to an area where it can be reused or crystallized by open air evaporation. Tubes 21 and 23 receive wastewater. Tube 21 receives wastewater from its source and allows tank 2 to fill. Tube 23 receives wastewater that has been recirculated through the evaporative material 26 and evaporative components 6 and removed from tank 2 via drain 19.

Figure 1A:
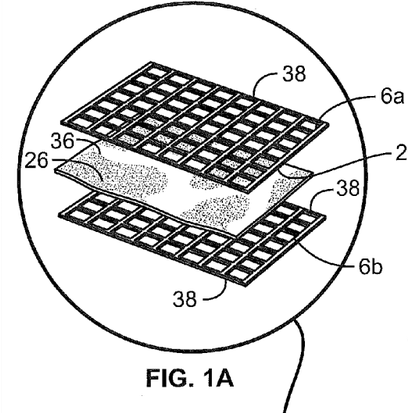
FIG. 1A is an exploded view of evaporative material and evaporative components according to one embodiment of the present invention.

FIG. 1 (A) illustrates evaporative material 26 between opposed holding members or grids 6a and 6b which comprise evaporative components 6. Evaporative material 26 is securely held in position and is placed between holding members or grids 6a and 6b by any suitable arrangement, preferably, a snap fit configuration in which one grid contains a groove and the opposed grid contains a tongue for insertion into the groove, not shown, on periphery 38 of the grids, or by fasteners placed on periphery 38 enabling quick release of grids 6a and 6b for removing evaporative material 26. Grid 6a and 6b may be made of plastic, wood or metal, resistant to water.

With reference to FIG. 2, tank 2 is shown with a plurality of sprinklers or drip valves 40 and conduit 42 attached to pump 44 for recycling and distribution of wastewater 4 to evaporative material 26. The distribution of wastewater 4 is directed to the extended area 36 of the evaporative material 26 and grids 6a and 6b that contain wastewater 4 which is moved by migration vertically on evaporative material 26. The sprinklers or drip valves 40 assist in the distribution of wastewater 4 for evaporation thereof. For example, the spraying or dripping of water 4 may be directed to the top or upper sides of extended area 36 of evaporative material 26, allowing wastewater 4 to move by gravity on the evaporative material 26.

Figure 3:
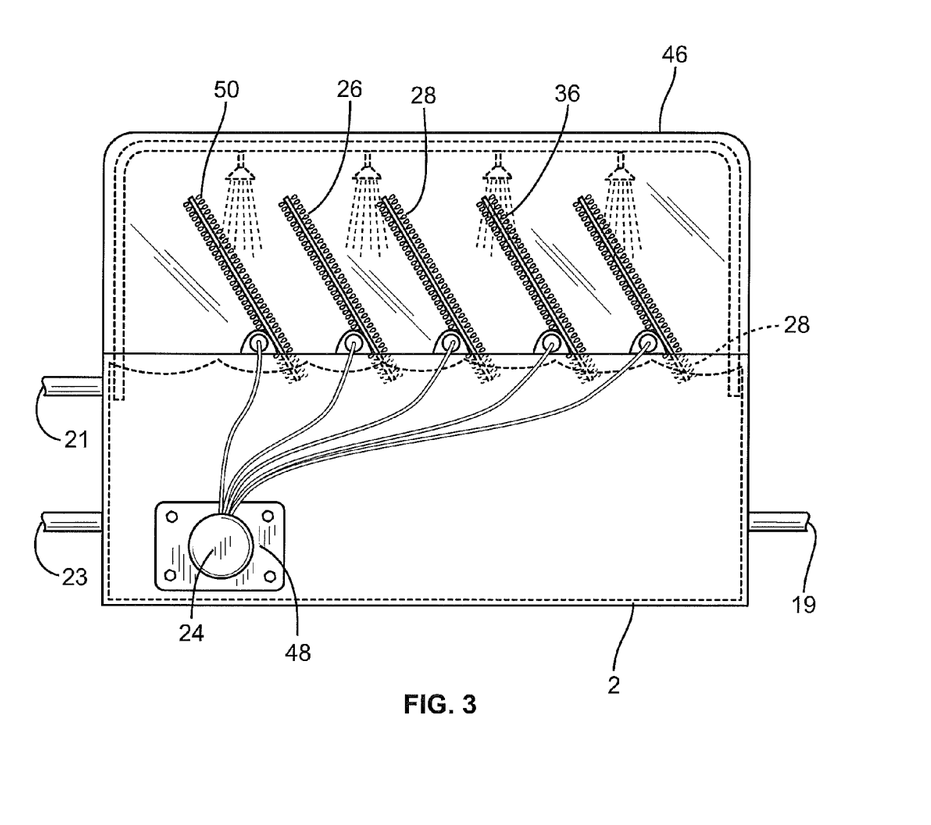
FIG. 3 is a side view of another embodiment of the present invention.

FIG. 3 describes cover 46 on tank 2 which allows solar energy to pass through onto evaporative material 26 and wastewater 4. Cover 46 is made from any clear or translucent material that allows solar energy to pass through it such as plastic or glass. Tank 2 is of any reasonable size and dimension depending on the volume of wastewater to be treated. It must be resistant to the chemicals or contaminants in the wastewater. The size and shape of tank 2 can be chosen by anyone skilled in the art. It can be fabricated from conventional materials. Tracking device 48 is utilized to orient evaporative components 6 so that evaporative material 26 is optimally positioned for receiving solar energy for accelerated evaporation of water and concentration of solids. Tracking device 48 can have any conventional power source and has a timing mechanism to orient evaporative components 6 to track sunlight.

Evaporative material 26 has a large surface area and excellent wetting characteristics. The material may be a natural, vegetable or plant fiber for example, cotton, jute, kenaf and ramie. It can be woven or nonwoven. Jute is a long, soft, shiny vegetable fiber that is spun into coarse, strong threads. Jute fibers are composed primarily of cellulose and lignin and are often formed into loops. It is partially a textile fiber and partially wood. Kenaf is another vegetable fiber. The fibers are found in the bark and wood of the plant. Kenaf fibers are frequently used in rope, twine, coarse cloth and paper. Ramie is a flowering plant and its fibers have been used for thousands of years. The bark of the plant is removed. It is scraped to remove the outer layer and then is washed and de-gummed to extract the fiber.

Evaporative material 26 has increased surface area when compared to plain cotton cloth. Preferably, evaporative material 26 contains loops 50 on one or both sides of the material. Loops 50 may be even or varying in height. Even height of loops 50 is preferred. The loops in cotton terry cloth provide a large area for absorbing water and exposing it to wind and sun. It is a preferred evaporative material 26.

FIG. 4 is a schematic flow diagram showing the path of concentrated wastewater to be reused or recirculated to tank 2 for further accelerated evaporation to be concentrated or into an area for crystallization, for example, another pan, where open air evaporation takes place without evaporative material 26. Crystallized solids are removed manually or mechanically and sundried on a screen or dried by any suitable device. The dry solids are stored for reuse, sale or disposal. The solids can be concentrated until the saturation point is reached in evaporative material 26 and tank 2. The saturation point may be monitored by by measuring the specific gravity of the wastewater. Solids expressed on evaporative material 26 are washed with a minimum volume of water or wastewater and mixed saturated solution through drain 19.

Figure 5:
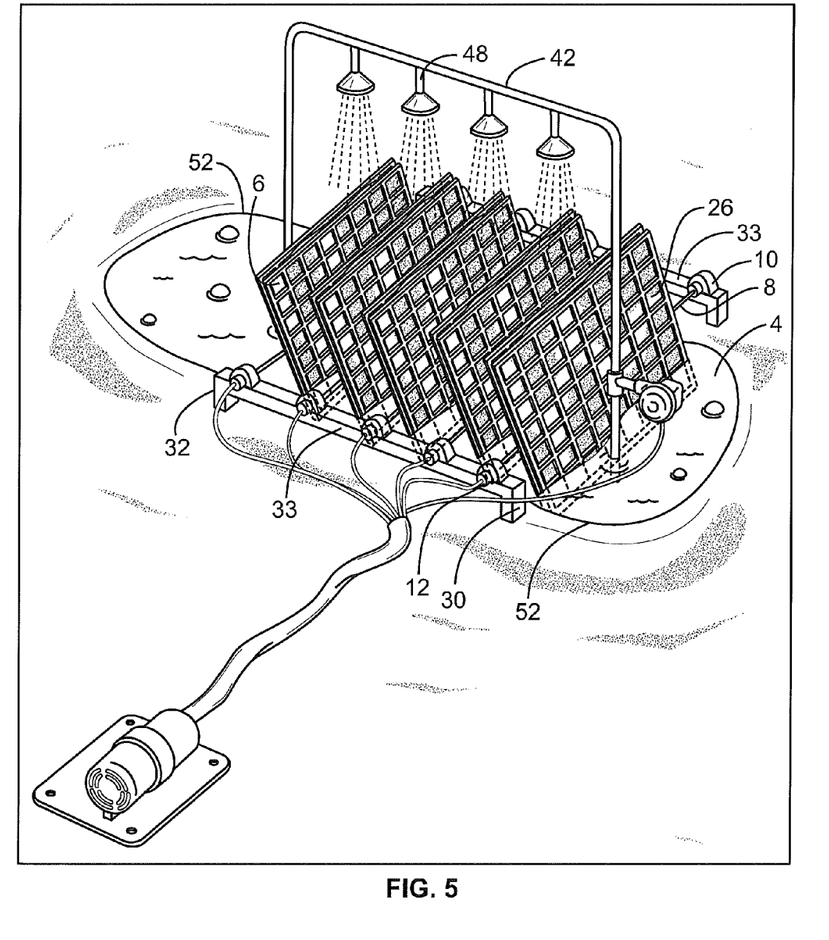
FIG. 5 is a perspective view of another embodiment of the present invention.

FIG. 5 shows the apparatus on the banks 52 of a wastewater source or pond. Legs 30 and 32 support the device over the wastewater source. The device may also be placed on the bottom of the water source or pond if the level of the water is a sufficient depth for contacting evaporative material 26.

Figure 6:
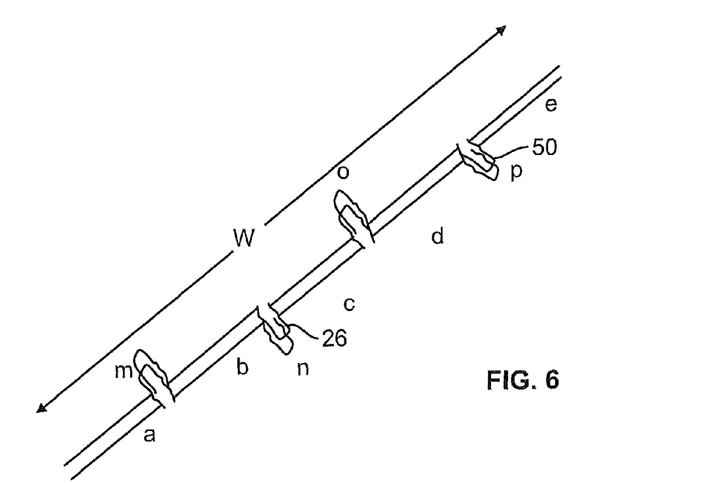
FIG. 6 is a cross sectional schematic view of one evaporative material of the present invention showing loops that increase the surface area and water absorbing capacity of the evaporative material.

FIG. 6 is a schematic cross section of evaporative material 26 showing the measurement of the area of the material with loops 50. The presence of loops 50 greatly increases the surface area of the material and therefore increases the evaporation of water and concentration of solids present in the water. The width of the material is W which is approximately equal to the sum of straight portions a, b, c, d, e, . . . of evaporative material 26. Loops in the drawing, identified as m, n, o, p, . . . are present, on both sides of material 26. The length of the section of material 26 with loops 50 is then a+m+b+n+c+ . . . etc, which is longer than the mere width W.

The area of evaporative material 26 is calculated as follows. The nominal area is calculated by W×(times) L, where L is length. However, the true surface area of the evaporative material 26 is L×(a+m+b+n+c+ . . . ). The latter is much larger than W×L resulting in evaporative material 26 absorbing more wastewater 4 than would have been possible without loops 50.

Figure 7:
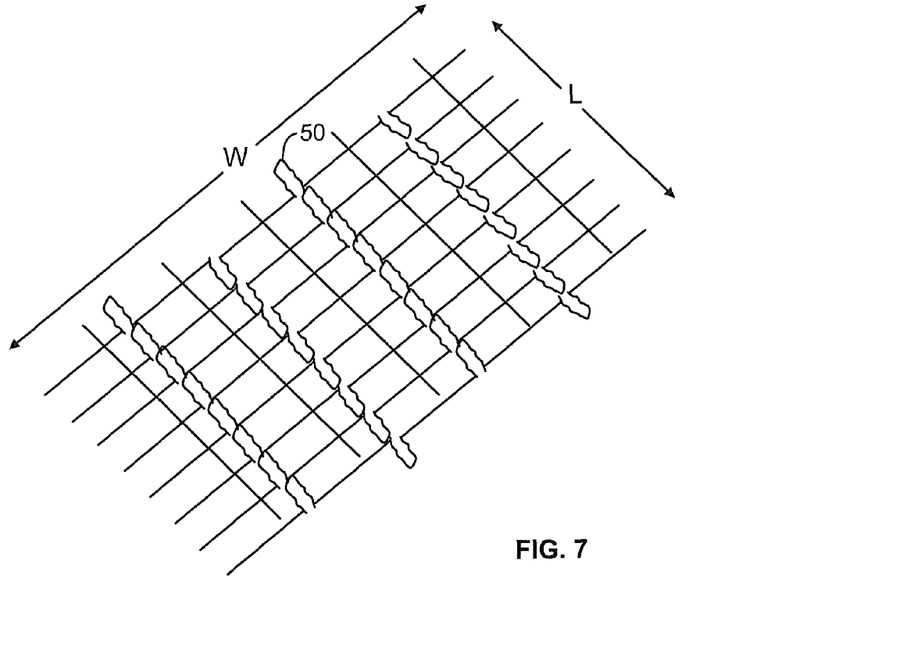
FIG. 7 is a perspective schematic view of the evaporative material showing the evaporative material containing loops and its relation to surface area.
Figure 8:
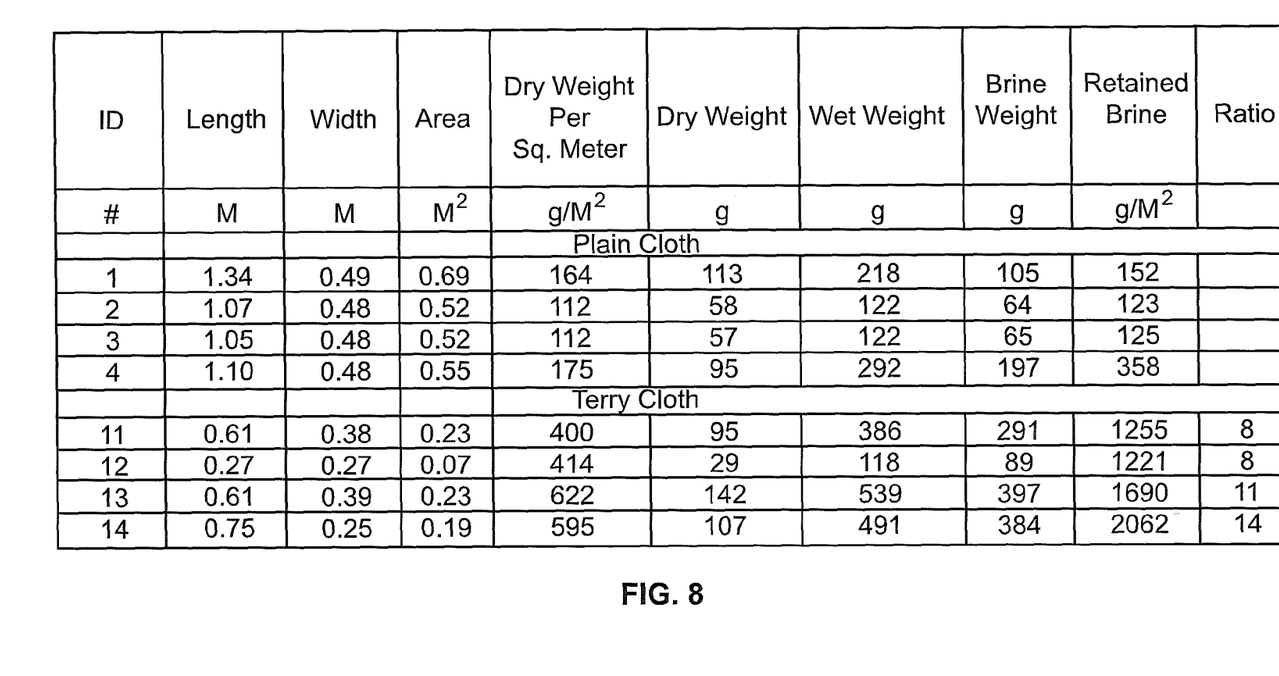
FIG. 8 is a table showing the evaporative data of Example 2.

FIG. 7 shows a representation of the orientation of loops 50 in cotton terry cloth with W for width and L for length in accordance with FIG. 6.

In order to show the improved performance of evaporative material 26, Example 1 is provided.

Example 1

An aqueous solution of 2% sodium chloride is provided as artificial wastewater placed in a tank under a cover of clear, translucent plastic as shown in FIG. 3. Evaporative components were used in two of three tanks, A) with no component, allowing wind and sun for evaporation, B) contains one evaporative component that is not irrigated by a sprinkler or drip valve, and C) contains an evaporative component with drip irrigation of water onto the top of the evaporative material. The evaporative material is cotton terry cloth with loops. The units were placed in the open air environment for approximately 48 to 72 hours, allowing evaporation to occur. The surface area of water and evaporative material was measured. All evaporative materials and components in Columns B and C were of varying sizes. No evaporative material or components were used in the tanks of Column A.

Results are shown in Table 1 and a summary of results in Table 2. Table 1 shows the evaporation per total area per day of 24 hours. Table 2 show a comparison of using no evaporative material with increased surface area by adding more evaporative surface. It is seen that compared to the trays in Column A with no evaporative material, the evaporation in the trays of Columns B and C increased to 284% and 372% respectively with additional evaporative material and the use of drip irrigation.

Tables 1 and 2

| Tray number | A Tray with no evaporator | | B Tray with evaporator, un-irrigated | | C Trays with evaporator, drip irrigated | |
|---|---|---|---|---|---|---|
| | Total Area $M^2$ | Evaporation L/Day | Total Area $M^2$ | Evaporation L/Day | Total Area $M^2$ | Evaporation L/Day |
| 1 | 0.04 | 0.09 | 0.21 | 0.35 | 0.24 | 0.58 |
| 2 | 0.11 | 0.23 | 0.31 | 0.42 | 0.34 | 0.63 |
| 3 | 0.13 | 0.25 | 0.38 | 0.47 | 0.41 | 0.74 |
| 4 | 0.17 | 0.35 | 0.48 | 0.71 | 0.48 | 0.93 |

| Evaporator | Brine Surface Area $M^2$ | Evaporator Surface Area added $M^2$ | Total Surface Area $M^2$ | Water evaporated L/Day | Evaporation % |
|---|---|---|---|---|---|
| No Evaporator | 0.13 | Nil | 0.13 | 0.25 | 100 |
| Capillary action only (Un-irrigated Evaporator) | 0.13 | 0.35 | 0.48 | 0.71 | 284 |
| Irrigated Evaporator | 0.13 | 0.35 | 0.48 | 0.93 | 372 |

Example 2

This test compared two types of evaporative materials, 100% cotton terry cloth and plain 100% cotton cloth, e.g., a bed sheet, in 2% sodium chloride brine for their retention capacity of wastewater including dissolved solids. The cloths have different mass per square meter. The length, width and mass of each sample cloth was measured and recorded. Each sample cloth was numbered for identification. The cloths were immersed in brine for one hour, removed and allowed to drip dry for one-half hour and weighed again. The difference in the weight measurements before wetting and after provides the mass of water absorbed by each sample cloth. This amount is computed for grams of brine absorbed per square meter of each evaporative material. FIG. 7 shows a summary of all the results.

The results show that terry cloth absorbs a factor of 8 to 13 times more brine than the plain cloth. FIG. 7 shows the absorption of plain cloth, nos. 1-4, was in the range of 152 to 358 g/square meters whereas the absorption of terry cloth, nos. 11-16, under the same conditions was in the range of 1221 to 2062 g/square meter. The terry cloth absorbed an average of more than 10 times the amount than plain cloth. In sample numbers 11-14, a ratio is shown wherein the retained brine of each sample of terry cloth was divided by the absorption results of the plain cloth. It is clearly seen that the loops contained in terry cloth provide a larger area of absorption of water and therefore for the evaporation of water and concentration of solids from the water.

In operation, evaporative material 26 is attached to evaporative components 6 in a manner to allow evaporative material 26 or a portion thereof to contact wastewater 4. A preferred method of attaching evaporative material 26 to evaporative component 6 is hold the material in between grids 6a and 6b as shown in FIG. 1A, on the components. Wastewater 4, due to the nature of evaporative material 26 migrates onto the material and evaporates. Solids are concentrated by this action in the wastewater in the pond or tank. Due to the accelerated evaporation of wastewater by evaporative material 26 the increasing amount of wastewater being removed allows more solids to precipitate to the bottom of the tank or pond. These may be removed by conventional methods, for example, dredging, vacuuming or scooping the sludge from the bottom for disposal.

While the invention has been described with respect to preferred embodiments, it will be appreciated that many variations, modifications and other applications can be made.

What is claimed is:

1. A method of accelerating open air evaporation of water and concentration of solids from wastewater, comprising the steps of:
   a) supporting an evaporative material on a evaporative component in a manner sufficient to have the evaporative material contact the wastewater, wherein the wastewater migrates upwardly on the evaporative material, the evaporative material having a top,
   b) securing the evaporative material within holding members on the evaporative components,
   c) wetting the top of the evaporative material with wastewater pumped through a conduit and distributed on the top of the evaporative material, allowing the wastewater to be moved by gravity through the evaporative material,
   d) exposing the evaporative material and evaporative components to wind and sun to facilitate the absorption of the water and concentration of solids from the wastewater.

2. The method according to claim 1 wherein the evaporative components are oriented to track the sun.

3. The method according to claim 1 wherein the evaporative material is fabric with loops that absorb wastewater.

4. The method according to claim 1 wherein the evaporative material is cotton.

5. The method according to claim 1 wherein the evaporative material is woven.

6. The method according to claim 3 wherein the loops are on two sides of the fabric.

7. The method according to claim 3 wherein the loops are on one side of the fabric.

8. The method according to claim 1 wherein the evaporative material is jute, kenaf, ramie, or other natural fibers.

9. The method according to claim 1 wherein the concentrated solids are removed from the evaporative material.

10. The method according to claim 1 wherein the concentrated solids are removed from the wastewater.

* * * * *